United States Patent [19]

Visket

[11] Patent Number: 4,773,445
[45] Date of Patent: Sep. 27, 1988

[54] SOLENOID VALVE
[75] Inventor: Rudolf Visket, Chatsworth, Calif.
[73] Assignee: Kaiser Aerospace and Electronics Corporation, Oakland, Calif.
[21] Appl. No.: 917,720
[22] Filed: Oct. 10, 1986
[51] Int. Cl.[4] ............................................. F16K 31/06
[52] U.S. Cl. .................. 137/595; 137/870; 251/129.15; 251/129.16; 251/337
[58] Field of Search .............................. 137/870, 595; 251/129.16, 337, 129.15

[56] References Cited

U.S. PATENT DOCUMENTS

| | | | |
|---|---|---|---|
| 2,321,853 | 6/1943 | Ray | 251/129.16 |
| 2,881,980 | 4/1959 | Beck et al. | 251/129.16 X |
| 3,472,277 | 10/1969 | Reinicke et al. | 137/595 |
| 4,196,751 | 4/1980 | Fischer et al. | 251/129.16 X |

FOREIGN PATENT DOCUMENTS

| | | | |
|---|---|---|---|
| 172204 | 2/1952 | Austria | 251/337 |
| 317849 | 1/1972 | U.S.S.R. | 137/595 |
| 1291766 | 10/1972 | United Kingdom | 251/129.16 |

Primary Examiner—Arnold Rosenthal
Attorney, Agent, or Firm—Marvin H. Kleinberg

[57] ABSTRACT

An improved solenoid poppet valve includes an endless magnetic gap loop which overlies the valve chamber. The axis of the poppet valve intersects the magnetic gap and can be self centered by the energizing of the solenoid. The valve chamber can be sealed from the solenoid coil and magnetic poles using a relatively thin isolating material which can be fully supported by the magnetic pole structure. A novel dual rate spring combination supports and centers the poppets in the valve chamber. The spring provides one force to maintained the valve in the closed position and a second, greater force to "kick" the poppet away from the magnetic poles when the solenoid is deenergized. In alternative embodiments, the valve of the present invention can control the flow of one or several fluids. Yet other embodiments can provide several valves to control the flow of a single fluid.

30 Claims, 3 Drawing Sheets

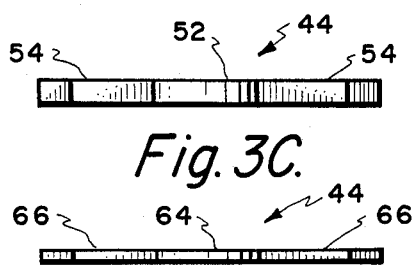
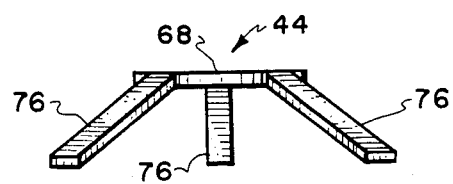
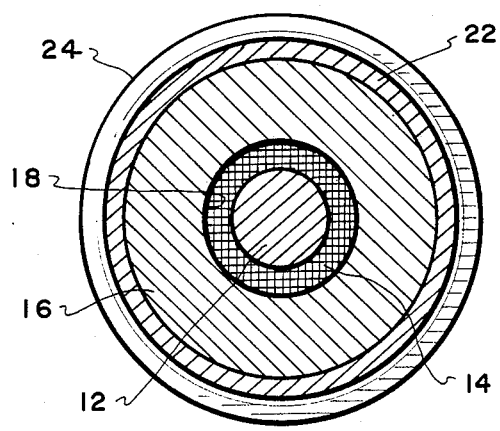
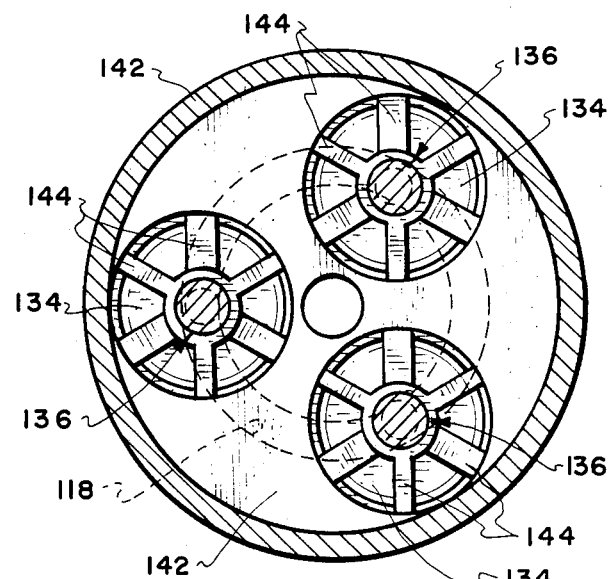
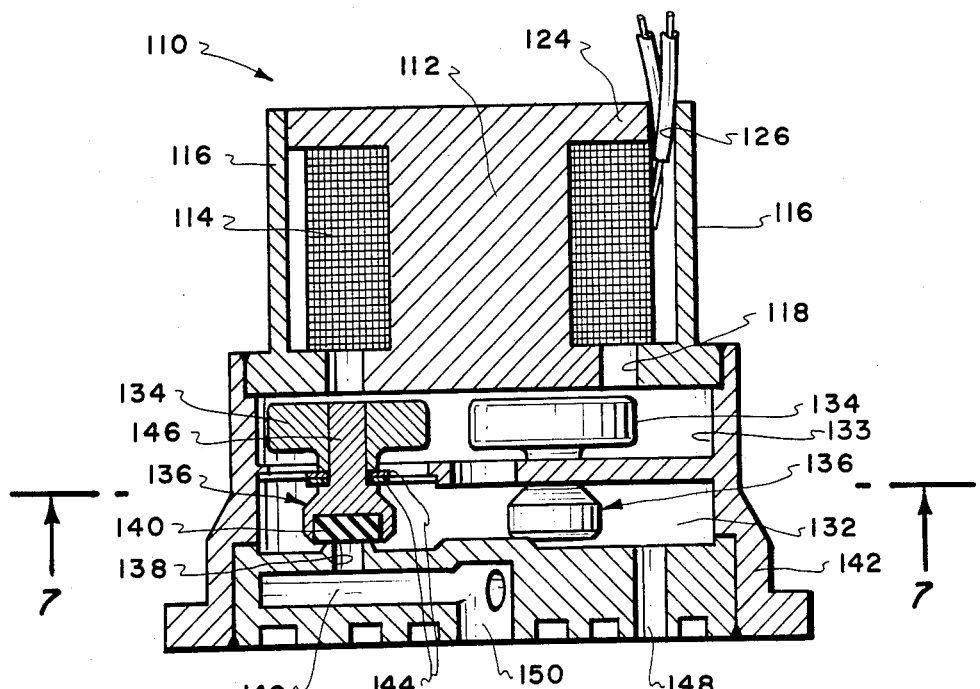

SOLENOID VALVE

The present invention relates to solenoid valves and, more particularly, a novel solenoid valve for use with propellants, the flow of which must be started and stopped virtually instantaneously.

In propellant delivery systems, a fluid, such as a liquid or gas under substantial pressure must be fed to a point of combustion. In most vehicles which utilize such propellants, either a combination of propellants are mixed resulting in ignition and combustion or a single propellant is brought to a combustion chamber and ignited.

In either event, the propellant must be brought to the area of combustion as rapidly as possible following a signal directing the release of the propellant. Similarly, the flow must cease substantially instantaneously after receiving a signal halting the release of the propellant, with a minimum of "dribble" or leakage after the flow has been shut off.

When hypergolic propellants are used, the components must be isolated from each other until they are combined in the combustion chamber. Accordingly, conventional methods of sealing may not be adequate, since O-rings, bellows, or diaphragms and the like may fatigue, deteriorate, or may lose flexibility at the extremely low temperatures that are normally associated with some propellants, such as the liquified gases.

Other problems that may be anticipated include the need to have no particulate contamination that might affect performance. Accordingly, a suitable valve must have fairly simple and unobstructed passages. Moreover, the operating elements of the valve should not bind or otherwise interfere with the structure of the valve housing so as to introduce particulates from the valve components, themselves.

In the prior art, the most satisfactory type of valve has been found to be a poppet valve. However, poppet valves are susceptible to "self-contamination" from the dynamic movements experienced by the poppet engaging the walls of the housing and the resulting operational wear from such contact.

Because the response time of such a valve is so critical, the valve should be in close proximity to the combustion chamber and, in the case of bipropellant valves, both orifices should be in close proximity to each other to speed up the ignition on and ignition off response times.

As noted above, if ignition is to be halted and the valve is ordered closed, it should be accomplished substantially instantaneously so that the propulsive force cease on command Moreover, the volume of propellant remaining in the lines after shutoff should be as small as possible.

If a poppet type valve under solenoid control is employed, it is necessary to use spring members to drive the poppet once the magnetic field is relaxed. However a greater spring force may be required to start closing the valve than is required to merely maintain the valve closed in the absence of the magnetic field.

BRIEF SUMMARY OF INVENTION

According to the present invention, a novel poppet valve is provided in which the solenoid windings and magnetic pole pieces are completely isolated from the chamber in which the poppet valve operates and through which the propellant flows when the valve is "opened". A novel dual rate spring combination supports and centers the poppet in the chamber and provides one spring rate to start the valve closing action when the magnetic field is terminated, and a different spring rate to hold the poppet closed in the absence of a magnetic field.

Through a unique solenoid design, a circular gap is provided, only a small sector of which overlies the valve chamber. A central axis of the chamber passes through the center of the valve orifice and is coaxial with the poppet. The central axis also passes through the center of the gap sector so that the poppet is substantially in the center of a magnetic field when the solenoid is energized.

A star shaped spring extends radially from the poppet and is held in the wall of the chamber. The poppet is designed to have a short linear stroke so that at least some of the spring arms can be considered "low rate" springs to bias the poppet in the "closed" configuration to maintain it "closed". Other arms of the spring may be considered "high rate" springs which do not assist in keeping the valve closed but resist the magnetic field which opens the valve. Because the effect of the magnetic field is non linear, the other "high rate" spring arms can have a greater spring effect that is different from the effect of the arms that bias the valve closed.

The use of the star spring supporting and centering the poppet in the chamber avoids "self contamination" which is caused by contact of the poppet with the chamber walls. The face of the valve includes a sealing element which cooperates with the orifice and valve seat to make the valve leakproof, especially with applied fluid pressures greater than 1,000 PSID (pounds/square inch/differential). Further, the poppet can be positioned in the chamber so that the gap between an outer pole piece and an inner pole piece is intercepted by the axis of the poppet. The magnetic field then acts to "center" the poppet in the chamber and mimimizes lateral motion. Moreover, the poppet is constrained by the field to maintain an axial orientation, without "tilting" or "cocking" during travel.

Upon energizing the solenoid, the poppet is pulled upward against the bias of the "low rate" star spring arms. As the poppet travels upward, the orifice is opened permitting a flow of fluid under pressure. At the upper limit of travel, the other, "high rate" spring arms are engaged, strongly resisting the pull of the magnetic field. When the magnetic field is relaxed, these "high rate" spring arms propel the poppet toward the closed configuration.

In alternative designs, the poppet valve can close either the inlet port or the outlet port. In propellant control systems, control of the outlet port would be preferable as this would minimize the volume of propellant in the outlet lines when the valve is closed. The poppet is designed so that a maximum fluid flow can be achieved with limited axial travel.

An additional feature of the design of the present invention is the availability of a secure, fluid tight seal at the "top" of the chamber adjacent the solenoid and magnetic pole pieces. Thin, fluid tight membranes can hermetically seal the fluid chambers since they need not be self supporting. The solenoid and inner and outer pole pieces can provide adequate backing to withstand any pressure that exists within the poppet chamber. Accordingly, the membrane can be quite thin, thereby decreasing the distance separating the poppet from the pole pieces when the solenoid is energized, increasing the strength of the magnetic field acting upon the poppet.

Because of the size and volume of the inner pole piece and the surrounding outer pole piece, the active area of the poppet can be much less than the area of the magnetic field that is created. As a result, a plurality of poppet valves can be actuated substantially simultaneously without taxing the magnetic field. Accordingly, a plurality of independent chambers can be created, each representing an independent valve, or a plurality of valves can operate in a common chamber, thereby permitting a greater fluid flow under control of the solenoid.

BRIEF DESCRIPTION OF DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 3 including

FIG. 3C is a side view of the star spring member 44 of FIG. 3A taken along line 3C—3C in the direction of the appended arrows;

FIG. 3D is a side view similar to FIG. 3C but of a thinner star spring member;

FIG. 3E is a a side view similar to FIG. 3C but with the spring arms 76 at a dihedral angle;

FIG. 4 is a sectional view of the inner and outer pole pieces of the valve of FIG. 1, taken along line 4—4 in the direction of the appended arrows;

FIG. 6 is a side sectional view of an alternative embodiment of the poppet valve of the present invention adapted to control the flow of a single fluid through the use of multiple poppets; and FIG. 7 is a sectional view of the valve of FIG. 6, taken along line 7—7 in the direction of the appended arrows.

DETAILED DESCRIPTION OF THE INVENTION

Figure 1:
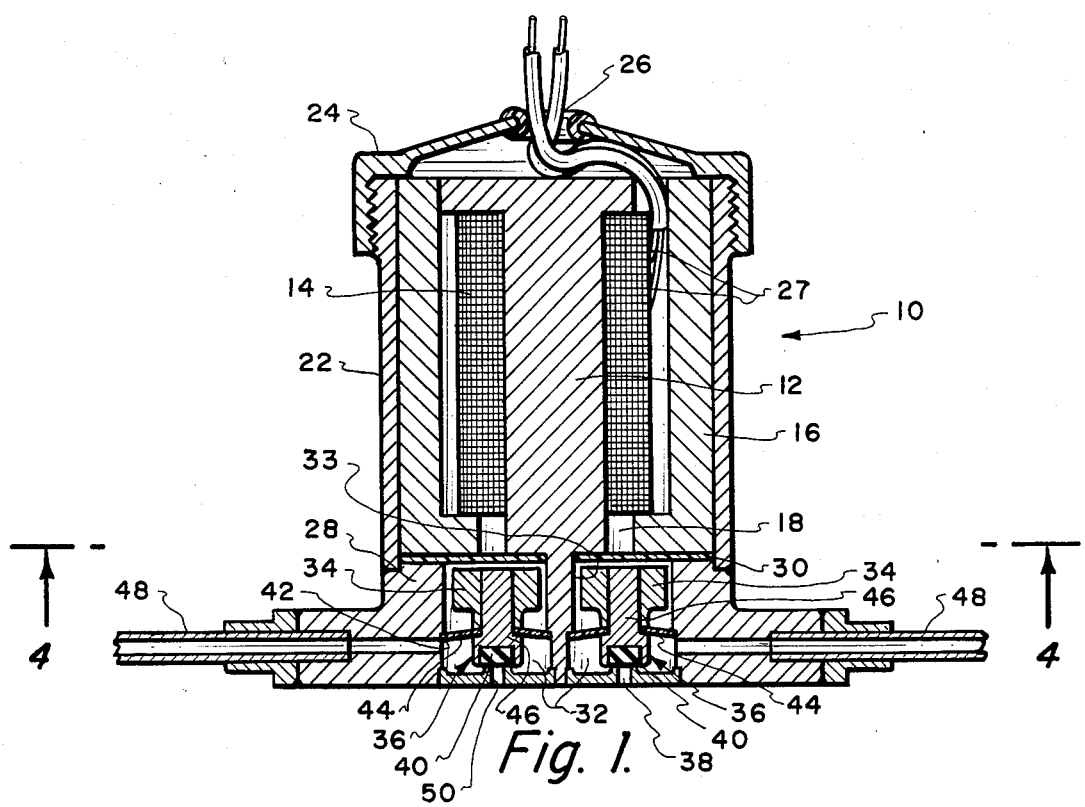
FIG. 1 is a side sectional view of a poppet valve according to the present invention simultaneous controlling the flow of two different fluids.

Turning first to FIG. 1, there is shown in side section, a solenoid valve 10 according to the present invention, adapted to simultaneously control the flow of two different fluids. For ease in explanation, the term "fluid" is intended to encompass gases as well as liquids.

A inner pole piece 12 is surrounded by a solenoid coil 14. A cylindrical outer pole 16 encloses a circular shunt 18 that is concentric with the inner pole piece 12, and provides a gap by the magnetically inert material. A housing 22 surrounds the cylindrical outer pole 16 and a protective cap 24 attaches to the housing 22. An opening 26 in the cap 24 allows an electrical connection to be made with the solenoid coil 14 by lead wires 27.

The valve body 28 includes a membrane 30 that hermetically seals the valve chambers 32 including inner walls 33 for isolating fluids from the flat face of the solenoid 10, including the inner pole piece 12, the circular shunt 18 and the outer pole 16, which provide whatever structural support is required for the membrane 30. The chambers 32 are cylindrical and the central axis of the chambers intercepts the center of the shunt 18. The chambers include an "upper portion" (as viewed in FIG. 1) in which the magnetizable head 34 of a poppet 36 is movable into close proximity to the flat face of the solenoid 10.

The seat of each chamber 32 includes a central orifice 38 which is adapted to be sealed by an appropriate elastomeric member 40 fitted into the bottom of the poppet 36. The lower portions of the chambers 32 are slightly greater in diameter than the upper portions and a "ledge" 42 is formed in the wall 33 at the transition point. A centering spring member 44 rests on the ledge 42 and is mounted on the central core 46 of the poppet 36. The centering spring member 44 is held in place by the head 34 of the poppet 36.

Inlet ports 48 communicate with the chambers 32 and supply fluids under pressure. Outlet ports 50 communicate with the orifices 38 in the seat of each chamber which are sealed closed by the elastomeric member 40 of the poppet 36. An appropriate manifold (not shown) can be coupled to the base of the valve in fluid communication with the outlet ports 50.

Normally, the bias of the centering spring members 44 maintain the poppets 36 against the orifices 38 leading to the outlet ports 50, sealing them closed. When the solenoid coil 14 is energized, the solenoid flat face becomes an electromagnet attracting the head 34 of the poppet 36, thus closing the magnetic flux gap caused by the shunt 18. The magnetic field is sufficiently strong to move the poppets 36 toward the top of their respective chambers 32 against the combined force of the centering spring members 44 and the pressure of the fluid system.

Figures 3A, 3B:
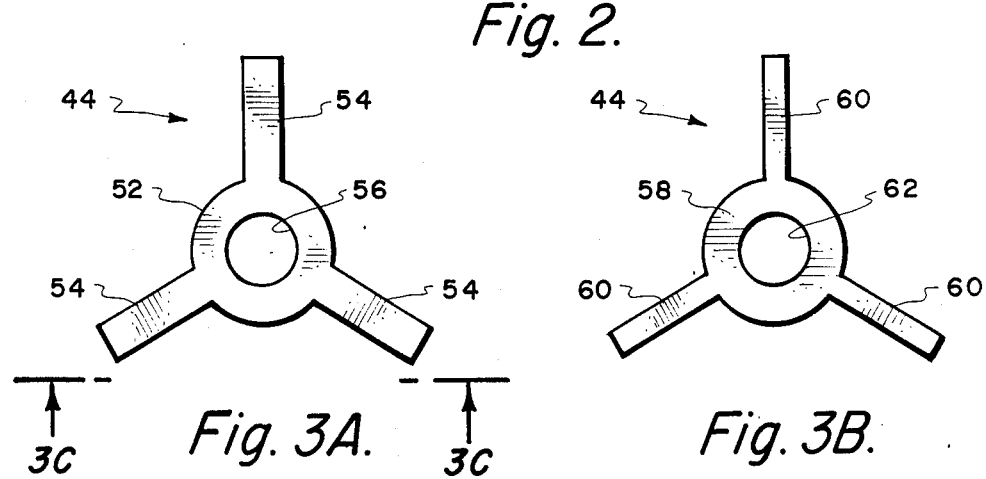
FIGS. 3A and 3B is a top view of star spring members useful in the poppet valve of the present invention.

The centering spring members 44, as better shown in FIGS. 3A and 3B, include a primary portion 58 whose arms 60 exhibit a first or low spring rate, and a secondary portion 52 whose arms 54 exhibit a second, high spring rate. When the poppet 36 is at the upper limit of its travel, both spring portions opposed the pull of the magnetic field.

When the solenoid is energized and the poppet is at the top of its travel, the valve is fully opened and the fluids can flow through the chambers 32 from the inlet to outlet ports. When the electrical current to the solenoid is terminated, and the magnetic field relaxes, the centering springs 44 "drive" the poppets 36 downward toward the closed position, sealing the orifices 38 and the outlet ports 50 and closing the valve 10.

Figure 2:
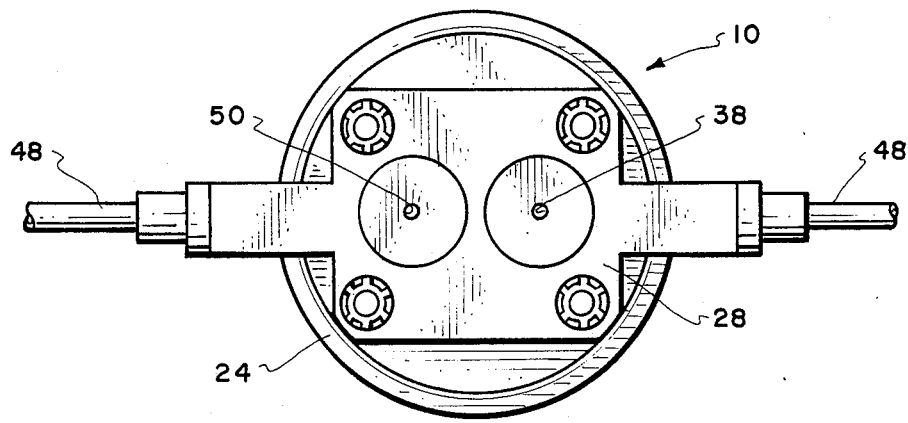
FIG. 2 is a bottom view of the valve of FIG. 1.

As seen in FIG. 2, the external base of the valve 10 is adapted to mount to a manifold that includes conduits that are in fluid communication with the outlet ports 50. These manifolds (not shown) could lead to a combustion chamber in which two propellants could be mixed and ignited. Using the valve of the present invention, a propulsion system could be accurately and closely controlled for precise maneuvering of a vehicle.

Turning next to FIG. 3, there is shown in a FIG. 3A, a first portion 52 of a centering spring 44. As seen, the preferred embodiment of the spring includes a set of three arms 54 which extend from a central body of the first portion that includes an aperture 56 sized to fit over the central core 46 of the poppet 36. The spring member 44 may be made from a sheet of flexible material which could be plastic or metal. Depending upon the use to which the valve 10 is to be put, the material may have to be inert to the fluids that are to be controlled and, accordingly, many applications may preclude the use of metals.

A second portion 58 of the spring 44 is shown in FIG. 3B and includes a set of three arms 60 which extend from the central body and a central aperture 62 substantially identical to aperture 56. Normally the two portions are used together and are aligned so that the arms of the two portions are equally spaced from each other, forming a hexagonal "star" pattern.

The spring rate of the arms 54 is a function of the stiffness and thickness of the sheet material and the width of the arm. For any desired spring rate, one selects the proper combination of stiffness, thickness and width. As seen in FIG. 3B, for a relatively low spring rate, the arms 60 of the second portion 58 are narrower than the arms 54 of the first or primary portion 52. FIGS. 3C and 3D illustrate that further variations in spring rate can be obtained by changing the thickness of the arms 54 of first portion 52 to the thickness of the arms 66 of third portion 64. An additional adjustment on the spring rate is available by bending or tipping the arms out of the plane of the central body. As shown in FIG. 3E, the arms 76 can form a dihedral angle with the central body of fourth portion 68. This enables a preload or bias on the poppet 36 when the solenoid coil 14 is not energized.

Similarly, the higher spring rate arms 54 can be tipped out of the plane in the opposite direction so that they are only engaged as the solenoid coil 14 is energized, opposing the magnetic force upon the head 34 of the poppet 36. Because the magnetic field is fairly strong for the poppet 36, and because the force of the field is non linear, varying as the square of the distance between the bodies, as the poppet 36 gets closer to inner pole piece 12, the increase in magnetic force is much greater than the linear force increase exhibited by the spring 44.

In FIG. 4, the circular shunt 18 can be seen more clearly. As shown, a finite area is provided between the cylindrical outer pole piece 16 and the inner pole piece 12. A plurality of magnetizable poppets can be arranged in the magnetic field centroid to shunt 18, limited only by the size of the poppet and the chamber that it occupies.

Figure 5:
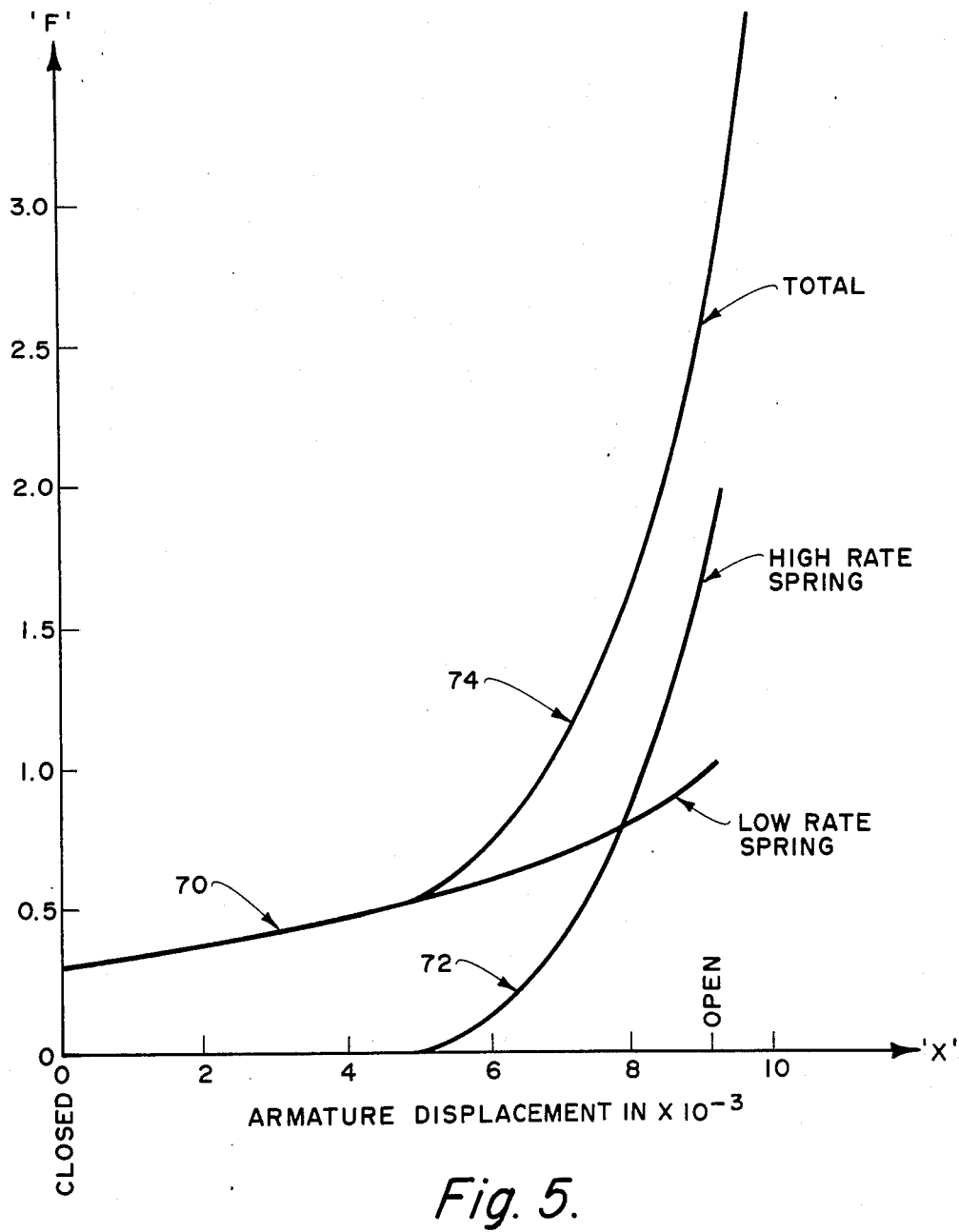
FIG. 5 is a graph showing applied force versus poppet displacement illustrating the effects of the dual rate star springs.

A graph illustrating the performance of the centering spring 44 is shown in FIG. 5. Displacement of the poppet 36 in inches $\times 10^{-3}$ is shown on the "X" or horizontal axis and, plotted against it on the "F" or vertical axis is the spring force, measured in lbs. A first curve 70 represents the force increment attributed to the primary or low rate spring portion 58 and a second curve 72 represents the force increment attributed to the secondary or high rate spring portion 52. A third, composite curve 74 shows the net force on the poppet 36 resisting the pull of the magnetic field.

As seen, when the poppet 36 has closed the orifice 38, a force of approximately 0.3 lbs. solely from the primary spring portion 59 biases the poppet 36 in the closed configuration. The resistive force gradually increases to 0.55 lbs. as the poppet 36 travels the first $5 \times 10^{-3}$ inches. At this point, the second spring portion 52 is engaged. When the poppet 36 has traveled an additional to approximately $6.0 \times 10^{-3}$ inches, the resisting force has increased to 0.75 lbs.

As the poppet 36 continues its movement, the second spring portion 52 is the dominant resistive force, exceeding the contribution of the primary portion 58 in less than $3 \times 10^{-3}$ inches of travel. By the time the poppet 36 has traveled $8 \times 10^{-3}$ inches, the spring force has reached 1.8 lbs. and, at the limit of travel, $9 \times 10^{-3}$, the force has increased to 3.0 lbs. This is the force available to propel the poppet 36 downward when the solenoid coil 14 is de energized and the magnetic field collapses.

In the preferred embodiment, a valve with two chambers and two poppets has been shown. However, this design is easily applicable to other valves in accordance with the teachings of the present invention. Similarly, while the preferred embodiment has shown a valve capable of controlling the flow of two different fluids, it is well within the inventive concept to provide a valve for a single fluid but with multiple poppets. One such embodiment is shown in FIGS. 6 and 7.

Turning now to FIG. 6, there is seen in side section, a valve designed to control the flow of a single fluid but through multiple output orifices which open on to a common manifold leading to an output port. The valve 110 includes a inner pole piece 112 surrounded by a solenoid coil 114. A cylindrical outer pole 116 encircles a circular shunt 118 and can be used as the housing of the electrical portion of the valve 110. An electromagnetic gap created by the circular shunt 118 is filled with a magnetically inert material.

The inner pole piece 112 has a flange 124 which is in contact with the cylindrical outer pole 116 to provide a flux path and enclose the solenoid coil 114. An opening 126 in the flange 124 enables electrical conductors to be connected to the solenoid coil 114 and, subsequently, to a source of power.

In the present example, three poppets 136 are located in a valve chamber 132 having an inner wall 133 and are equally spaced with respect to each other. Each poppet 136 includes a magnetizable head 134, a central core 146, and an elastomeric member 140 which seals an orifice 138 in the valve chamber 132.

A plate 142 mounted in chamber wall 133 separates the poppets 136 and supports a centering spring member 144 for each of them. An inlet port 148 supplies fluid to the valve chamber 132 and the orifices 138 couple through a manifold 149 to a common outlet port 150.

In FIG. 7, the positioning of the poppets can be seen in relation to the shunt 118 which is shown in phantom. As in the preferred embodiment, the central axis of each poppet head 134 passes through the center of the shunt 118. This, in conjunction with the centering springs 144, tends to keep the poppets 136 centered whenever the solenoid coil 114 is energized.

The valve 110 of FIGS. 6 and 7 operates in substantially the same fashion as the valve 10 of FIGS. 1 through 4. Other variations are possible, including designs that might have a fluid inlet conduit through the center of the inner pole piece. Other variations could change the number or placement of the poppets.

So long as the central axis of each poppet passes through the center of the shunt portion overlying the poppet head, the magnetic action will tend to keep the poppet centered. Similarly, the use of multi rate centering springs keeps the poppet away from the walls of the valve chamber and prevents self contamination from any wear that might result from such contact.

The special centering springs of the present invention function both to bias the poppet closed when there is no magnetic field, and to provide a propulsive "kick" or "push" to the poppet when the magnetic field collapses as the valve is "commanded" to close.

Thus there has been shown and described a novel poppet valve for controlling fluid flows having a novel centering spring supporting the biasing the poppet. Those skilled in the art will be able to develop other embodiments and variations without departing from the teachings herein. Accordingly, the scope of the invention should only be limited by the scope of the claims appended hereto.

What is claimed as new is:

1. An improved quick acting solenoid valve for regulating the flow of fluids, comprising in combination:
   (a) a central, inner pole piece having an axis;
   (b) a solenoid coil surrounding said central pole piece;
   (c) an outer pole piece surrounding said solenoid coil, including a portion underlying said solenoid coil and extending inwardly toward said inner pole piece;
   (d) a shunt member interposed between said outer pole piece portion and said inner pole piece to create a magnetic gap surrounding said inner pole piece for directing magnetic flux in the axial direction when said solenoid coil is energized, said inner and outer pole pieces creating a magnetic gap in a closed loop;
   (e) a valve body adjacent said inner pole piece, said outer pole piece and said shunt and isolated therefrom, said valve body having a first chamber having fluid entry and exit means and a second chamber having fluid entry and exit means;
   (f) first and second poppet valve means each including a magnetizable head portion and a base portion mounted to occlude one of said first and second chamber fluid entry and exit means; and
   (g) poppet valve positioning means for disposing each of said magnetic head portions adjacent said shunt member substantially in the center of the magnetic gap between said inner and outer pole pieces, each said poppet valve means being positioned within the valve body so that its axis intercepts said loop in the center of said magnetic gap, tending to align each said poppet valve means for axial travel;
   whereby energizing said solenoid coil causes an electromagnetic flux to be created through said poppet valve head portions, thereby attracting said poppet valves toward said pole pieces for opening the occluded ones of said fluid entry and exit means.

2. The solenoid valve of claim 1, above, wherein said inner pole piece, shunt member and said outer pole piece portion have surfaces that are coplanar to form a substantially contiguous planar surface, and wherein said valve body chamber is isolated from said planar surface by a membrane seal, supportingly positioned against said planar surface.

3. The solenoid valve of claim 1, above, wherein said valve body second chamber is isolated from said first chamber.

4. The solenoid valve of claim 1, above, wherein said poppet valve positioning means include centering spring means supporting said first and second poppet valve means in said first and second chambers, respectively, to prevent contact between said first and second poppet valve means and the adjacent first and second chamber inner wall surfaces.

5. The solenoid valve of claim 1, above, wherein said first and second poppet valve means each include elastomeric sealing means at the base thereof for occluding one of said chamber fluid entry and exit means.

6. The solenoid valve of claim 5, above, wherein said poppet valve means occlude said chamber fluid exit means.

7. The solenoid valve of claim 5, above, wherein said poppet valve means occlude said chamber fluid entry means.

8. An improved quick acting solenoid valve for regulating the flow of fluids, comprising in combination:
   (a) a central, inner pole piece having an axis;
   (b) a solenoid coil surrounding said central pole piece;
   (c) an outer pole piece surrounding said solenoid coil, including a portion underlying said solenoid coil and extending inwardly toward said inner pole piece;
   (d) a shunt member interposed between said outer pole piece portion and said inner pole piece to create a magnetic gap surrounding said inner pole piece for directing magnetic flux in the axial direction when said solenoid coil is energized, said inner and outer pole pieces and said shunt member creating a magnetic gap in a closed loop;
   (e) a valve body adjacent said inner pole piece, said outer pole piece and said shunt and isolated therefrom, said valve body having at least one chamber having fluid entry and exit means;
   (f) poppet valve means including a magnetizable head portion and a base portion mounted to occlude one of said chamber fluid entry and exit means; and
   (g) poppet valve positioning means for disposing said magnetic head adjacent said shunt member so that its axis intercepts said loop in the center of said magnetic gap, tending to align said poppet valve means for axial travel; whereby energizing said solenoid coil causes an electromagnetic flux to be created through said poppet valve head, thereby attracting said poppet valve toward said pole pieces for opening the occluded one of said fluid entry and exit means.

9. The solenoid valve of claim 8, above, wherein said inner pole piece, shunt member and said outer pole piece portion have surfaces that are coplanar to form a substantially contiguous planar surface, and wherein said valve body chamber is isolated from said planar surface by a membrane seal, supportingly positioned against said planar surface.

10. The solenoid valve of claim 8, above, wherein said poppet valve positioning means include centering spring means supporting said poppet valve means in said valve body to prevent contact between said poppet valve means and the adjacent chamber inner wall surfaces.

11. The solenoid valve of claim 8, above, wherein said poppet valve means include elastomeric sealing means at the base thereof for occluding the one of said fluid entry and exit means.

12. The solenoid valve of claim 11, above, wherein said poppet valve means occludes said fluid entry means.

13. The solenoid valve of claim 11, above, wherein said poppet valve means occludes said fluid exit means.

14. The solenoid valve of claim 8, above, further including second fluid exit means and second poppet valve means including a magnetizable head portion and a base portion mounted to occlude said second fluid exit means.

15. The solenoid valve of claim 14, above, wherein said poppet valve positioning means include centering spring means supporting said second poppet valve means in said valve body to prevent contact between said second poppet valve means and the adjacent chamber inner wall surfaces.

16. An improved quick acting solenoid valve for regulating the flow of fluids, comprising in combination:
    (a) a central, inner pole piece having an axis;
    (b) a solenoid coil surrounding said central pole piece;
    (c) an outer pole piece surrounding said solenoid coil, including a portion underlying said solenoid coil and extending inwardly toward said inner pole piece;
    (d) a shunt member interposed between said outer pole piece portion and said inner pole piece to create a magnetic gap surrounding said inner pole piece for directing magnetic flux in the axial direction when said solenoid coil is energized, said inner and outer pole pieces and said shunt member creating a magnetic gap in a closed loop;
    (e) a valve body adjacent said inner pole piece, said outer pole piece and said shunt and isolated therefrom, said valve body having at least one chamber having fluid entry and first and second exit means;
    (f) first and second poppet valve means each including a magnetizable head portion and a base portion mounted to occlude one of said chamber fluid exit means; and
    (g) poppet valve positioning means for disposing said first and second poppet valve means within the valve body with each magnetic head adjacent said shunt member so that the axis of each intercepts said loop in the center of said magnetic gap, tending to align said poppet valve means for axial travel,
whereby energizing said solenoid coil causes an electromagnetic flux to be created through said poppet valve head portions, thereby attracting both said poppet valve means toward said pole pieces for opening the occluded fluid exit means.

17. The solenoid valve of claim 14, above, wherein said second poppet valve means include elastomeric sealing means at the base thereof for occluding said second fluid exit means.

18. An improved quick acting solenoid valve for regulating the flow of fluids, comprising in combination:
    (a) a central, inner pole piece having an axis;
    (b) a solenoid coil surrounding said central pole piece;
    (c) an outer pole piece surrounding said solenoid coil, including a portion underlying said solenoid coil and extending inwardly toward said inner pole piece;
    (d) a shunt member interposed between said outer pole piece portion and said inner pole piece to create a magnetic gap surrounding said inner pole piece for directing magnetic flux in the axial direction when said solenoid coil is energized, said inner and outer pole pieces and said shunt member creating a magnetic gap in a closed loop;
    (e) a valve body adjacent said inner pole piece, said outer pole piece and said shunt and isolated therefrom, said valve body having at least a first chamber having fluid entry and exit means and a second chamber isolated from said first chamber, said second chamber including fluid entry and exit means;
    (f) first and second poppet valve means in said first and second chamber, respectively, each including a magnetizable head portion and a base portion mounted to occlude one of said first and second chamber fluid entry and exit means; and
    (g) poppet valve positioning means for disposing said magnetic head portions adjacent said shunt member so that each poppet valve axis intercepts said loop in the center of said magnetic gap, tending to align said poppet valve means for axial travel;
whereby energizing said solenoid coil causes an electromagnetic flux to be created through said poppet valve head portions, thereby attracting said poppet valves toward said pole pieces for opening the occluded ones of said fluid entry and exit means.

19. The solenoid valve of claim 18, above, wherein said poppet valve positioning means include centering spring means supporting said poppet valve means in said chambers to prevent contact between said poppet valve means and the adjacent respective chamber inner wall surfaces.

20. The solenoid valve of claim 18, above, wherein each said poppet valve means include elastomeric sealing means at the base thereof for occluding one of said first and second chamber fluid entry and exit means.

21. The solenoid valve of claim 20, above, wherein said poppet valve means occlude said chamber fluid exit means.

22. In a solenoid valve, centering spring means for supporting poppet valve means in the valve body to prevent contact between the poppet valve means and the adjacent chamber inner wall surfaces comprising:
    (a) a body portion of a resilient material;
    (b) a plurality of first arms radiating from said body portion and exhibiting a first spring rate; and
    (c) a plurality of second arms radiating from said body portion and exhibiting a second spring rate different from said first spring rate,
whereby engaging said plurality of first arms results in a first resistive force from said spring means and engaging said plurality of second arms results in a second resistive force from said spring means which forces can be combined.

23. The centering spring means of claim 22, above, wherein said first arms have a first width which is directly related to said first spring rate and said second arms have a second width which is directly related to said second spring rate.

24. The centering spring means of claim 22, above, wherein said first arms have a first thickness which is directly related to said first spring rate and said second arms have a second thickness which is directly related to said second spring rate.

25. The centering spring means of claim 22, above, wherein said first arms extend from said body portion at a first dihedral angle.

26. The centering spring means of claim 22, above, wherein said first arms extend from said body portion at a first dihedral angle and wherein said second arms extend from said body portion at a second dihedral angle, different from said first dihedral angle.

27. The centering spring means of claim 22, above, wherein said body portion includes a first body portion element from which said first arms radiate and a second body portion element from which said second arms radiate, said first and second body portions being adapted to stack, one upon the other.

28. The centering spring means of claim 27, above, wherein said first arms extend from said first body portion element at a first dihedral angle.

29. The centering spring means of claim 27, above, wherein said first arms extend from said first body portion element at a first dihedral angle and wherein said second arms extend from said second body portion element at a second dihedral angle, different from said first dihedral angle.

30. The solenoid valve of claim 20, above, wherein said poppet valve means occlude said chamber fluid entry means.

* * * * *